(12) United States Patent
Wang et al.

(10) Patent No.: US 10,833,508 B2
(45) Date of Patent: Nov. 10, 2020

(54) ACTIVE POWER DISTRIBUTION NETWORK MULTI-TIME SCALE COORDINATED OPTIMIZATION SCHEDULING METHOD AND STORAGE MEDIUM

(71) Applicants: CHINA ELECTRIC POWER RESEARCH INSTITUTE COMPANY LIMITED, Beijing (CN); STATE GRID CORPORATION OF CHINA, Beijing (CN); NORTH CHINA ELECTRIC POWER UNIVERSITY, Beijing (CN); STATE GRID TIANJIN ELECTRIC POWER COMPANY, Tianjin (CN); STATE GRID BEIJING ELECTRIC POWER COMPANY, Beijing (CN)

(72) Inventors: Xiaohui Wang, Beijing (CN); Tianjiao Pu, Beijing (CN); Lei Dong, Beijing (CN); Naishi Chen, Beijing (CN); Ye Li, Beijing (CN); Jiancheng Yu, Tianjin (CN); Renle Huang, Beijing (CN); Xianjun Ge, Beijing (CN); Zhihong Li, Beijing (CN); Minghao Ai, Beijing (CN); Fumin Qu, Beijing (CN); Liqiang Zhao, Beijing (CN)

(73) Assignees: CHINA ELECTRIC POWER RESEARCH INSTITUTE COMPANY LIMITED, Beijing (CN); STATE GRID CORPORATION OF CHINA, Beijing (CN); NORTH CHINA ELECTRIC POWER UNIVERSITY, Beijing (CN); STATE GRID BEIJING ELECTRIC POWER COMPANY, Beijing (CN); STATE GRID TIANJIN ELECTRIC POWER COMPANY, Tianjin (CN)

( * ) Notice: Subject to any disclaimer, the term of this patent is extended or adjusted under 35 U.S.C. 154(b) by 425 days.

(21) Appl. No.: 15/740,847

(22) PCT Filed: Jun. 27, 2016

(86) PCT No.: PCT/CN2016/087234
§ 371 (c)(1),
(2) Date: Dec. 29, 2017

(87) PCT Pub. No.: WO2017/000853
PCT Pub. Date: Jan. 5, 2017

(65) Prior Publication Data
US 2020/0033933 A1 Jan. 30, 2020

(30) Foreign Application Priority Data
Jun. 30, 2015 (CN) .......................... 2015 1 0373573

(51) Int. Cl.
*H02J 3/46* (2006.01)
*G06F 1/3209* (2019.01)
(Continued)

(52) U.S. Cl.
CPC .............. *H02J 3/46* (2013.01); *G06F 1/3209* (2013.01); *G06F 1/329* (2013.01); *G06F 1/3228* (2013.01);
(Continued)

(58) Field of Classification Search
CPC ..... H02J 3/46; H02J 3/12; H02J 3/003; G06F 1/3209; G06F 1/3228; G06F 1/329; G06F 17/16
(Continued)

(56) References Cited

U.S. PATENT DOCUMENTS 8,849,469 B2  9/2014  Belady
2012/0109705 A1  5/2012  Belady
(Continued)

FOREIGN PATENT DOCUMENTS

CN  102810186 A  12/2012
CN  103023074 A  4/2013
(Continued)

OTHER PUBLICATIONS

Tao Li, "Multi-time Scale Microgrid Energy Optimizing Management System Structure and Method" Espacenet description translation, Aug. 1, 2012, Espacenet (Year: 2012).*
(Continued)

*Primary Examiner* — Robert E Fennema
*Assistant Examiner* — Christopher W Carter
(74) *Attorney, Agent, or Firm* — Syncoda LLC; Feng Ma

(57) ABSTRACT

An active power distribution network multi-time scale coordinated optimization scheduling method and storage
(Continued)

medium are provided. The method includes the following steps: performing long-time scale optimization scheduling of an active power distribution network; performing short-time scale rolling optimization scheduling on the basis of MPC of the active power distribution network according to an optimization result of the long-time scale optimization scheduling of the active power distribution network. By using a model prediction control method, taking the long-time scale optimization scheduling result as a reference, and performing short-time scale rolling correction, the optimization scheduling of the active power distribution network is achieved, thereby reducing unfavorable influences of prediction precision of a distributed power supply and a low-voltage load on the optimization scheduling.

12 Claims, 4 Drawing Sheets

(51) Int. Cl.
- *G06F 1/3228* (2019.01)
- *G06F 1/329* (2019.01)
- *G06F 17/16* (2006.01)
- *H02J 3/12* (2006.01)
- *H02J 3/00* (2006.01)

(52) U.S. Cl.
CPC ............... *G06F 17/16* (2013.01); *H02J 3/12* (2013.01); *H02J 3/003* (2020.01)

(58) Field of Classification Search
USPC ........................................................ 700/286
See application file for complete search history.

(56) References Cited

U.S. PATENT DOCUMENTS

| | | | |
|---|---|---|---|
| 2014/0058571 | A1 | 2/2014 | Hooshmand et al. |
| 2014/0350743 | A1* | 11/2014 | Asghari ................... H02J 3/00 700/297 |

FOREIGN PATENT DOCUMENTS

| | | |
|---|---|---|
| CN | 103455854 A | 12/2013 |
| CN | 104181895 A | 12/2014 |
| CN | 104485681 A | 4/2015 |
| CN | 104505826 A | 4/2015 |
| CN | 104993522 A | 10/2015 |

OTHER PUBLICATIONS

International Search Report in international application No. PCT/CN2016/087234 dated Sep. 20, 2016.

English Translation of the Written Opinion of the International Search Authority in international application No. PCT/CN2016/087234, dated Sep. 20, 2016.

Liu, Chang et al. "Application of Model Predictive Control Method in Active Distribution Network Coordination Control", Electrical & Energy Management Technology, No. 11, Jun. 15, 2015 (Jun. 15, 2015).

"Multi-time Scale Coordinated Control of Distributed Generators Based on Active Distribution Network", Yi You, May 10, 2014.

"Multi-agent System Based Simulation Verification for Autonomy-cooperative Optimization Control on Active Distribution Network" Tianjiao PU, Apr. 20, 2015.

* cited by examiner

US 10,833,508 B2

ACTIVE POWER DISTRIBUTION NETWORK MULTI-TIME SCALE COORDINATED OPTIMIZATION SCHEDULING METHOD AND STORAGE MEDIUM

TECHNICAL FIELD

The disclosure relates to the field of multi-source coordinated optimization control for active power distribution networks, and particularly to a Model Predictive Control (MPC)-based multi-time-scale coordinated optimization scheduling method for an active power distribution network and a storage medium.

BACKGROUND

Along with massive access of distributed power generation, energy storage, electric vehicles and flexible loads, a power distribution network becomes an active network, controllable resources are gradually increased, the concept of active power distribution network is developed, and its optimization scheduling becomes the key for safe, stable, economic and efficient operation of the power distribution network.

At present, during coordinated optimization scheduling of an active power distribution network, layered optimization coordination is performed on the power distribution network according to a layered management characteristic of operation of the power distribution network, and coordination between different layers is implemented by uploading a schedulable capacity and transmitting an optimization target curve. Such a timepoint-based deterministic optimization strategy may not meet an access requirement of massive random and intermittent distributed power supplies. Therefore, a multi-time-scale coordinated optimization scheduling technology is proposed to implement resource optimization allocation within a range of the active power distribution network. However, how to reduce influence of inaccurate prediction about distributed power supplies and loads, realize "multilevel coordination and level-by-level detailing" by multi-time-scale coordinated optimization scheduling and fully utilize advantages of optimization scheduling of each time scale is always a knotty problem.

MPC is a type of model-based finite time-domain closed-loop optimal control algorithm, and has been well applied to industrial process control. In each sampling period, a controller determines a system state of a current moment as an initial control state, and solves a problem about optimal control within a finite duration by online rolling on the basis of a prediction result, obtained by a prediction model, about a future state, thereby obtaining a current control behavior to minimize a difference between future output and a reference trajectory. MPC is formed by three parts, i.e. the prediction model, rolling optimization and feedback correction.

The prediction model predicts a future output value of a process according to historical information and future input of the process to provide priori knowledge for optimization of MPC. Rolling optimization implements repeated rolling optimization on a control target on the basis of an output feedback result of a practical system to obtain an optimal control measure for a future time bucket. Feedback correction corrects an advanced control strategy provided by a rolling optimization algorithm in a feedback manner on the basis of a measured value of steady-state output of the practical system.

SUMMARY

For the shortcoming of a conventional art, embodiments of the disclosure are expected to provide a multi-time-scale coordinated optimization scheduling method for an active power distribution network and a storage medium, to implement optimization scheduling of the active power distribution network, thereby reducing negative influence of prediction accuracy of distributed power supplies and low-voltage loads on optimization scheduling.

The embodiments of the disclosure are implemented by adopting the following technical solutions.

The embodiments of the disclosure provide a multi-time-scale coordinated optimization scheduling method for an active power distribution network, which includes the following steps:

(1): long-time-scale optimization scheduling is performed on the active power distribution network; and (2): MPC-based short-time-scale rolling optimization scheduling is performed on the active power distribution network according to an optimization result of long-time-scale optimization scheduling of the active power distribution network.

As an implementation mode, Step (1) includes:

(1-1): a distributed power supply predicted value $\hat{P}_k(t)$, load predicted value $\hat{P}_{load}(t)$, adjustable energy storage capacity and adjustable flexible load capacity of the active power distribution network under a long time scale are acquired;

(1-2): a long-time-scale optimization scheduling model for the active power distribution network is constructed; and (1-3): the optimization result of long-time-scale optimization scheduling of the active power distribution network is acquired, the optimization result including: energy storage output power $P_{stori}(t)$ and flexible load output power $\Delta P_{Lj}(t)$.

As an implementation mode, the long-time-scale optimization scheduling model for the active power distribution network in Step (1-2) includes: a target function for long-time-scale optimization scheduling and a constraint condition;

the target function for long-time-scale optimization scheduling is:

$$\min F = \min \sum_{t=1}^{T1} \left\{ c_{grid}(t) P_{grid}(t) + \sum_{i=1}^{NL} C_{loadi}(t) + \sum_{j=1}^{NS} C_{storj}(t) \right\}, \quad (1)$$

in formula (1), min F being a minimum value of cost in long-time-scale optimization scheduling of the active power distribution network, $c_{grid}(t)$ representing a time-of-use electricity price of a power grid, $P_{grid}(t)$ being output power of a tie line under the long time scale, $C_{loadi}(t)$ being flexible load scheduling cost, $C_{storj}(t)$ being energy storage equipment scheduling cost, T1 representing a long-time-scale optimization scheduling period, NL being a number of flexible loads in the active power distribution network and NS being a number of energy storage devices; and the constraint condition includes: a power constraint of the tie line of the active power distribution network and a main network, a power balance constraint, an energy storage battery constraint, a flexible load constraint and a network power flow security constraint.

As an implementation mode, the power constraint of the tie line of the active power distribution network and the main network includes: $-P_L^{max}(t) \le P_{grid}(t) \le P_L^{max}(t)$, $P_L^{max}(t)$ being an upper limit value of active power of the tie line under the long time scale, $P_L^{min}(t)$ being a lower limit value of the active power of the tie line under the long time scale and $P_{grid}(t)$ being the output power of the tie line under the long time scale; the power balance constraint includes:

$$\sum_{i=1}^{NS} P_{stori}(t) + \sum_{j=1}^{NL} \Delta P_{Lj}(t) + \sum_{k=1}^{wind+solar} \hat{P}_k(t) + P_{grid}(t) = \hat{P}_{load}(t) + P_{loss}(t),$$

$P_{grid}(t)$ being the output power of the tie line under the long time scale, $P_{stori}(t)$ being the energy storage output power of long-time-scale optimization scheduling, $\Delta P_{Lj}(t)$ being the flexible load output power of long-time-scale optimization scheduling, $\hat{P}_k(t)$ being the distributed power supply predicted value of the active power distribution network under the long time scale, $\hat{P}_{load}(t)$ being the load predicted value of the active power distribution network under the long time scale and $P_{loss}(t)$ being active power loss of the active power distribution network under the long time scale; the energy storage battery constraint includes: when an energy storage battery is discharged under the long time scale, $P_{storj}(t)>0$ and a left capacity of a moment t is $$SOC_j(t) = SOC_j(t-1)(1-\sigma) - \frac{P_{storj}(t)}{\eta_D},$$

when the energy storage battery is charged under the long time scale, $P_{storj}(t)<0$ and the left capacity of the moment t is $SOC_j(t)=SOC_j(t-1)(1-\sigma)-P_{storj}(t)\eta_C$, a charge and discharge power constraint of the energy storage battery under the long time scale is: $P_{storj}^{min} \leq P_{storj}(t) \leq P_{storj}^{max}$, and a capacity constraint of the energy storage battery under the long time scale is: $SOC_j^{min} \leq SOC_j(t) \leq SOC_j^{max}$, where $\sigma$ is a self-discharge rate of the energy storage battery under the long time scale, $\eta_C$ is charge efficiency of the energy storage battery under the long time scale, $\eta_D$ is discharge efficiency of the enemy storage battery under the long time scale, $SOC_j(t-1)$ is a left energy storage capacity of a last moment under the long time scale, $SOC_j(t)$ is a left energy storage capacity of the moment t under the long time scale, $SOC_j^{max}$ is an upper limit value of a left capacity of the energy storage battery under the long time scale, $SOC_j^{min}$ is a lower limit value of the left capacity of the energy storage battery under the long time scale, $P_{storj}^{max}$ is an upper limit value of charge power of the energy storage battery under the long time scale, and $P_{storj}^{min}$ is a lower limit value of discharge power of the energy storage battery under the long time scale; the flexible load constraint includes: $\Delta P_{Li\ min} \leq \Delta P_{Li} \leq \Delta P_{Li\ max}$, $\Delta P_{Li\ max}$ being an upper limit value of a flexible load power change under the long time scale, $\Delta P_{Li\ min}$ being a lower limit value of the flexible load power change under the long time scale and $\Delta P_{Lj}(t)$ being the flexible load output power of long-time-scale optimization scheduling; and the network power flow security constraint includes: $V_{min} \leq V_n \leq V_{max}$ and $I_b \leq I_{b.rated}$, $V_n$ being a node voltage amplitude under the long time scale, $V_{max}$ being an upper limit value of the node voltage amplitude under the long time scale, $V_{min}$ being a lower limit value of the node voltage amplitude under the long time scale, $I_b$ being a branch current under the long time scale and $I_{b.rated}$ being a branch rated current under the long time scale.

As an implementation mode, Step (2) includes:

(2-1): a distributed power supply predicted value $\hat{P}_k(t)'$, load predicted value $\hat{P}_{load}(t)'$, adjustable energy storage capacity and adjustable flexible load capacity of the active power distribution network under a short time scale and the optimization result of long-time-scale optimization scheduling of the active power distribution network are acquired, the optimization result of long-time-scale optimization scheduling of the active power distribution network including: the energy storage output power $P_{stori}(t)$ and the flexible load output power $\Delta P_{Lj}(t)$;

(2-2): a short-time-scale optimization scheduling model for the active power distribution network is constructed;

(2-3): energy storage output power $P_{stori}(t)'$ and flexible load output power $\Delta P_{Lj}(t)'$ of short-time-scale optimization scheduling of the active power distribution network and an optimization result $\tilde{y}(k)$ of a moment k in a solution sequence are acquired, $\tilde{y}(k)$ including energy storage output power $P_{stori}(k)'$ of the moment k and flexible load output power $\Delta P_{Lj}(k)'$ of the moment k;

(2-4): feedback correction is performed on the short-time-scale optimization scheduling model for the active power distribution network according to a real-time operation state of the active power distribution network; and (2-5): if long-time-scale optimization scheduling is ended or an optimization scheduling process is artificially interrupted, short-time-scale optimization scheduling is ended, otherwise rolling optimization is performed on short-time-scale optimization scheduling according to a feedback correction result.

As an implementation mode, the operation that the short-time-scale optimization scheduling model for the active power distribution network is constructed in Step (2-2) includes:

(2-2-1): an optimization time bucket T of long-time-scale optimization scheduling of the active power distribution network is acquired, and a short-time-scale optimization scheduling period is set; and (2-2-2): a target function for short-time-scale optimization scheduling and a constraint condition are designed, wherein the target function for short-time-scale optimization scheduling is:

$$\min f = \sum_{t=t_0+1}^{t=t_0+T} \left\{ \sum_{i=1}^{NS} \omega_i |P_{stori}(t)' - P_{stori}(t)| + \sum_{j=1}^{NL} \omega_j |\Delta P_{Lj}(t)' - \Delta P_{Lj}(t)| + \omega_g |P_{grid}(t)' - P_{grid}(t)| \right\}, \quad (2)$$

in formula (2), T being the optimization time bucket of long-time-scale optimization scheduling of the active power distribution network, $P_{grid}(t)$ being power of the tie line under the long time scale, $P_{stori}(t)$ being the energy storage output power of long-time-scale optimization scheduling, $\Delta P_{Lj}(t)$ being the flexible load output power of long-time-scale optimization scheduling, $P_{grid}(t)$ being power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\omega_i$ being an energy storage weight coefficient, $\omega_j$ being a flexible load weight coefficient, $\omega_g$ being a tie line weight coefficient, $t_0$ being an initial moment, NL being the number of the flexible loads in the active power distribution network, NS being the number of the energy storage devices and min f being a minimum value of cost in short-time-scale optimization scheduling of the active power distribution network; and the constraint condition includes: the power constraint of the tie line of the active power distribution network and the main network, the power balance constraint, the energy storage battery constraint, the flexible load constraint and the network power flow security constraint.

As an implementation mode, the power constraint of the tie line of the active power distribution network and the main network includes: $-P_L^{max}(t)' \leq P_{grid}(t)' \leq P_L^{max}(t)'$, $P_L^{max}(t)'$ being an upper limit value of active power of the tie line under the short time scale, $P_L^{min}(t)'$ being a lower limit value of the active power of the tie line under the short time scale and $P_{grid}(t)'$ being power of the tie line under the short time scale; the power balance constraint includes:

$$\sum_{i=1}^{NS} P_{stori}(t)' + \sum_{j=1}^{NL} \Delta P_{Lj}(t') + \sum_{k=1}^{wind+solar} \hat{P}_k(t)' + P_{grid}(t)' = \hat{P}_{load}(t)' + P_{loss}(t)',$$

$P_{grid}(t)'$ being the power of the tie line under the short time scale, $P_{stori}(t)'$ being the energy storage output power of short-tune-scale optimization scheduling, $\Delta P_{Lj}(t)'$ being the flexible load output power of short-time-scale optimization scheduling, $\hat{P}_k(t)'$ being the distributed power supply predicted value of the active power distribution network under the short time scale, $\hat{P}_{load}(t)'$ being the load predicted value of the active power distribution network under the short time scale and $P_{loss}(t)'$ being active power loss of the active power distribution network under the short time scale; the energy storage battery constraint includes: when the energy storage battery is discharged under the short time scale, $P_{storj}(t))' > 0$ and the left capacity of the moment t is:

$$SOC_j(t)' = SOC_j(t-1)(1-\sigma)' - \frac{P_{storj}(t)'}{\eta_D'},$$

when the energy storage battery is charged under the short time scale, $P_{storj}(t)' < 0$ and the left capacity of the moment t is: $SOC_j(t)' = SOC_j(t-1)(1-\sigma)' - P_{storj}(t)'\eta_C'$, a charge and discharge power constraint of the energy storage battery under the short time scale is: $P_{storj}^{mim'} \leq P_{storj}(t)' \leq P_{storj}^{max'}$, and a capacity constraint of the energy storage battery under the short time scale is: $SOC_j^{mim'} \leq SOC_j(t)' \leq SOC_j^{max'}$, where $\sigma'$ is a self-discharge rate of the energy storage battery under the short time scale, $\eta_C'$ is charge efficiency of the energy storage battery under the short time scale, $\eta_D'$ is discharge efficiency of the energy storage battery under the short time scale, $SOC_j(t-1)'$ is a left energy storage capacity of the last moment under the short time scale, $SOC_j(t)'$ is a left energy storage capacity of the moment t under the short time scale, $SOC_j^{max'}$ is an upper limit value of a left capacity of the energy storage battery under the short time scale, $SOC_j^{mim'}$ is a tower limit value of the left capacity of the energy storage battery under the short time scale, $P_{storj}^{max'}$ is an upper limit value of charge power of the energy storage battery under the short time scale, and $P_{storj}^{mim'}$ is a lower limit value of the discharge power of the energy storage battery under the short time scale; the flexible load constraint includes: $\Delta P_{Li\ min}' \leq \Delta P_{Li}' \leq \Delta P_{Li\ max}'$, $\Delta P_{Li\ max}'$ being an upper limit value of a flexible load power change under the short time scale, $\Delta P_{Li\ min}'$ being a lower limit value of the flexible load power change under the short time scale and $\Delta P_{Lj}(t)'$ being flexible load output power of short-time-scale optimization scheduling; and the network power flow security constraint includes: $V_{min}' \leq V_n' \leq V_{max}'$ and $I_b' \leq I_{b.rated}'$, $V_n'$ being a node voltage amplitude under the short time scale, $V_{max}'$ being an upper limit value of the node voltage amplitude under the short time scale, $V_{min}'$ being a lower limit value of the node voltage amplitude under the short time scale, $I_b'$ being a branch current under the short time scale and $I_{b.rated}'$ being a rated current under the short time scale.

As an implementation mode, the operation that feedback correction is performed on the short-time-scale optimization scheduling model for the active power distribution network according to the real-time operation state of the active power distribution network in Step (2-4) includes:

(2-4-1): the optimization time bucket T of long-time-scale optimization scheduling of the active power distribution network is acquired, a prediction period m of short-time-scale optimization scheduling of the active power distribution network is set, and an optimization time bucket p of short-time-scale optimization scheduling of the active power distribution network is calculated;

(2-4-2): an error e(k) between a practical output result y(k) of the active power distribution network at the moment k and the optimization result ỹ(k) of the moment k in short-time-scale optimization scheduling of the active power distribution network is calculated:

$$e(k) = y(k) - \tilde{y}(k) \quad (3); \text{ and}$$

(2-4-3): optimization results from moments k+1 to k+p in short-time-scale optimization scheduling of the active power distribution network are corrected according to the error e(k):

$$\begin{bmatrix} \tilde{y}_1(k+1) \\ \tilde{y}_1(k+2) \\ \vdots \\ \tilde{y}_1(k+p) \end{bmatrix} = \begin{bmatrix} \tilde{y}(k+1) \\ \tilde{y}(k+1) \\ \vdots \\ \tilde{y}(k+p) \end{bmatrix} + \begin{bmatrix} h_{k+1} \\ h_{k+2} \\ \vdots \\ h_{k+p} \end{bmatrix} e(k), \quad (4)$$

in formula (4), $\tilde{y}_1(k+p)$ being a correction result of the optimization result $\tilde{y}(k+p)$ of the moment k+p, and $h_{k+p}$ being model information of the moment k+p, being obtained by offline identification and being a constant matrix.

The embodiments of the disclosure further provide a storage medium, in which a computer-executable instruction is stored, the computer-executable instruction being configured to execute the multi-time-scale coordinated optimization scheduling method of the embodiments of the disclosure for the active power distribution network.

The embodiments of the disclosure have the following beneficial effects.

(1) A multi-time-scale coordination and cooperation manner is adopted for multi-source optimization scheduling of the active power distribution network, so that an economic scheduling factor under the long time scale may be met, voltage quality, smooth output of power supplies and power balance conditions of the power distribution network under the short time scale may also be met, and purposes of "multilevel coordination, level-by-level detailing and economic scheduling" of the active power distribution network may be achieved.

(2) Long-time-scale optimization scheduling aims to minimize the cost in optimization scheduling of the active power distribution network, emphasizes operation cost of the whole scheduling period, and may implement maximal utilization of distributed energy and implement operation economy of the active power distribution network.

(3) MPC is introduced into short-time-scale optimization scheduling, rolling optimization of a finite time bucket may be implemented in each optimization scheduling period on the basis of latest predicted data, and global optimization is replaced with time bucket optimization, so that influence of low prediction accuracy of distributed power supplies and loads of the power distribution network is reduced, and an optimized operation level of the active power distribution network is improved.

DETAILED DESCRIPTION

Specific implementation modes of the disclosure will be described below in combination with the drawings in detail.

In order to make the purpose, technical solutions and advantages of the embodiments of the disclosure clearer, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work fall within the scope of protection of the disclosure.

In addition, in the method embodiment provided by the disclosure, a tie line refers to a transmission line between an active power distribution network and a main network; scheduling cost refers to cost produced in a scheduling process, i.e. a sum of cost in power transmission of the tie line, scheduling cost of flexible loads and energy storage scheduling cost; the flexible load refers to a load which may be dynamically adjusted according to a requirement; a long time scale refers to performing optimization for a relatively long time to meet a requirement on optimization scheduling economy, is usually set to be one day, and may also be autonomously set according to a requirement; a short time scale refers to performing optimization for a short time to meet a requirement on optimization scheduling real-time performance, is usually set to be 5 minutes, and may also be autonomously set according to a requirement; and an optimization period refers to an optimization time bucket set according to the requirements of the long and short time scales.

Figure 1:
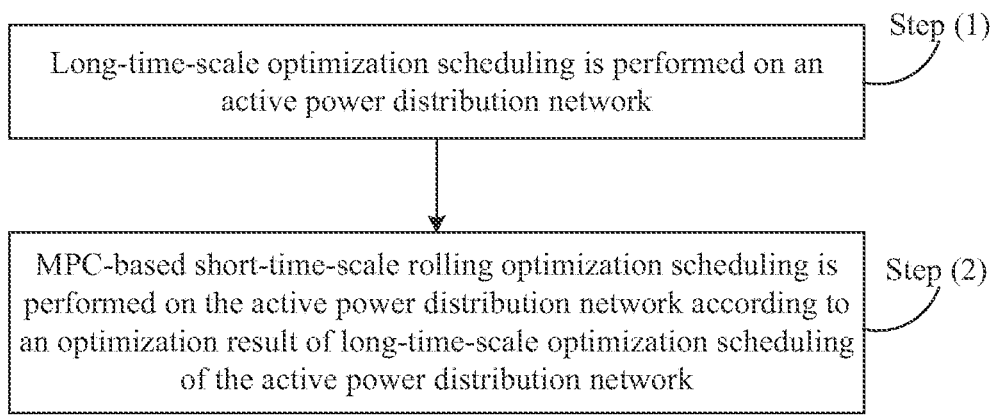
FIG. 1 is a flowchart of a multi-time-scale coordinated optimization scheduling method for an active power distribution network according to an embodiment of the disclosure.

A multi-time-scale coordinated optimization scheduling method provided by an embodiment of the disclosure for an active power distribution network, as shown in FIG. 1, includes the following steps.

In Step (1), long-time-scale optimization scheduling is performed on the active power distribution network.

In Step (2), MPC-based short-time-scale rolling optimization scheduling is performed on the active power distribution network according to an optimization result of long-time-scale optimization scheduling of the active power distribution network.

Specifically, the multi-time-scale coordinated optimization scheduling solution of the embodiment of the disclosure for the active power distribution network includes a long-time-scale optimization scheduling solution and a short-time-scale optimization scheduling solution. A specific implementation process of the long-time-scale optimization scheduling solution may refer to FIG. 3. A specific implementation process of the short-time-scale optimization scheduling solution may refer to FIG. 4.

Figure 2:
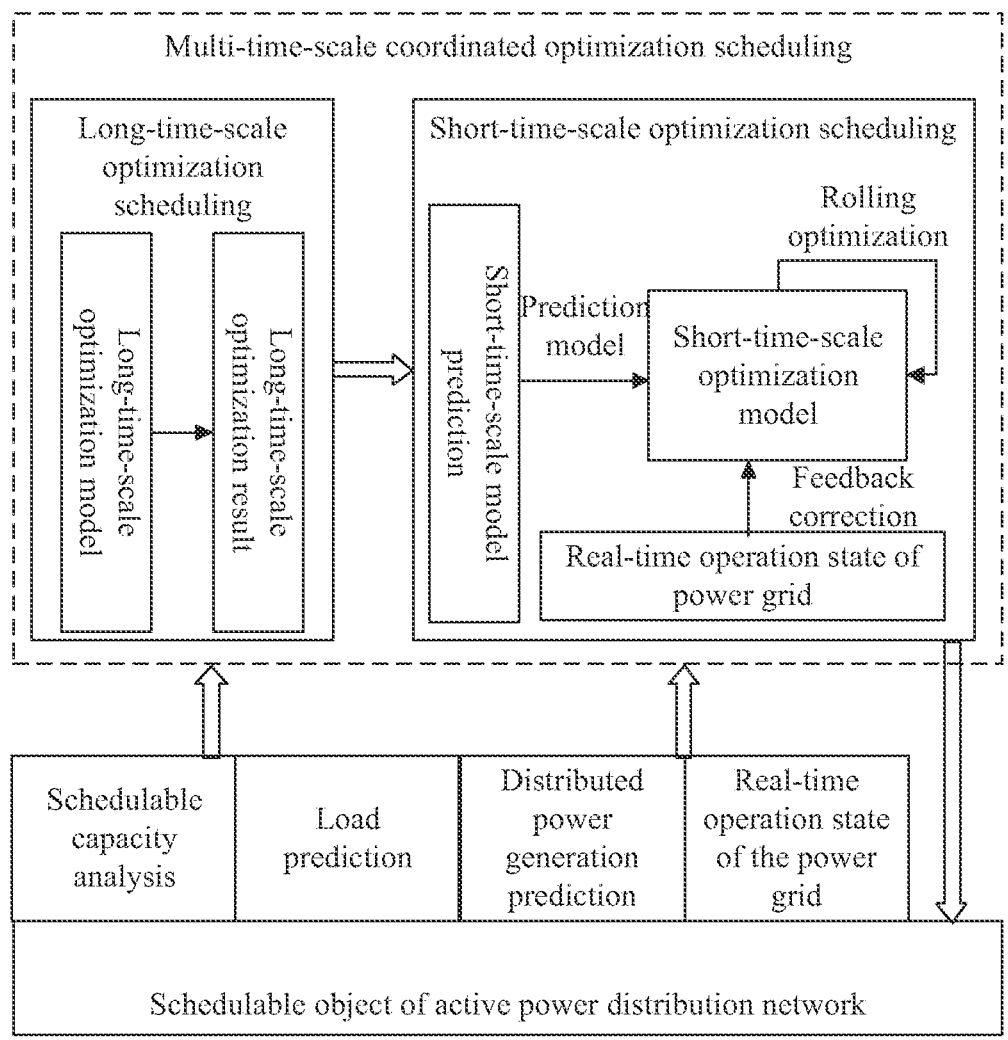
FIG. 2 is a process diagram of a multi-time-scale coordinated optimization scheduling method for an active power distribution network according to an embodiment of the disclosure.
Figure 3:
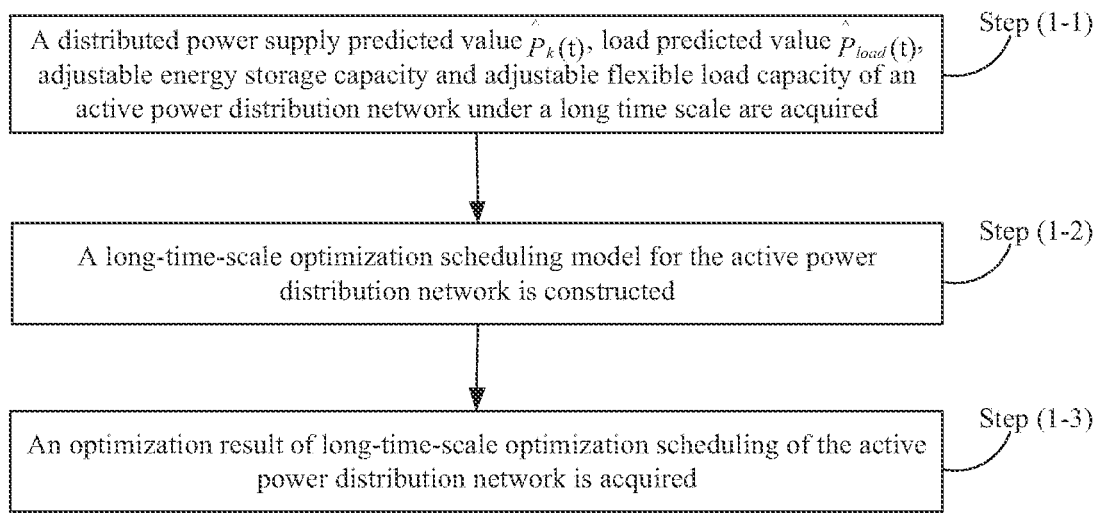
FIG. 3 is a specific flowchart of a method shown in Step (1) in FIG. 1.

Specifically, in combination with FIG. 2 and FIG. 3, Step (1) includes the following steps.

In Step (1-1), a distributed power supply predicted value $\hat{P}_k(t)$, load predicted value $\hat{P}_{load}(t)$, adjustable energy storage capacity and adjustable flexible load capacity of the active power distribution network under a long time scale are acquired, wherein the distributed power supply predicted value $\hat{P}_k(t)$ and load predicted value $\hat{P}_{load}(t)$ of the active power distribution network under the long time scale are power curves calculated under the long time scale, the adjustable energy storage capacity includes a current left energy storage capacity and an adjustable margin, and the adjustable flexible load capacity is an adjustable flexible load margin calculated according to importance of a flexible load and a subscribed flexible load adjustment protocol.

In Step (1-2), a long-time-scale optimization scheduling model for the active power distribution network is constructed.

In Step (1-3), the optimization result of long-time-scale optimization scheduling of the active power distribution network is acquired, the optimization result including: energy storage output power $P_{storj}(t)$ and flexible load output power $\Delta P_{Lj}(t)$, wherein the optimization result may be obtained by solving the long-time-scale optimization scheduling model for the active power distribution network by an optimization tool.

As an implementation mode, the long-time-scale optimization scheduling model for the active power distribution network in Step (1-2) includes: a target function for long-time-scale optimization scheduling and a constraint condition;

the long-time-scale optimization scheduling model aims to minimize cost in optimization scheduling of the active power distribution network, emphasizes operation cost of the whole scheduling period, and meanwhile, adopts a Maximum Power Point Tracking (MPPT) control mode to implement maximal utilization of distributed energy, and the target function for long-lime-scale optimization scheduling is:

$$\min F = \min \sum_{t=1}^{T1} \left\{ c_{grid}(t)P_{grid}(t) + \sum_{i=1}^{NL} C_{loadi}(t) + \sum_{j=1}^{NS} C_{storj}(t) \right\}, \quad (1\text{-}1)$$

in formula (1-1), min F being a minimum value of cost in long-time-scale optimization scheduling of the active power distribution network, $c_{grid}(t)$ representing a time-of-use electricity price of a power grid, $P_{grid}(t)$ being output power of a tie line under the long time scale, $C_{loadi}(t)$ being flexible load scheduling cost, $C_{storj}(t)$ being energy storage equipment scheduling cost, T1 representing a long-time-scale optimization scheduling period, NL being a number of flexible loads in the active power distribution network and NS being a number of energy storage devices; and the constraint condition includes: a power constraint of the tie line of the active power distribution network and a main network, a power balance constraint, an energy storage battery constraint, a flexible load constraint and a network power flow security constraint.

As an implementation mode, the power constraint of the tie line of the active power distribution network and the main network includes: $-P_L^{max}(t) \leq P_{grid}(t) \leq P_L^{max}(t)$, $P_L^{max}(t)$ being an upper limit value of active power of the tie line under the long time scale, $P_L^{min}(t)$ being a lower limit value of the active power of the tie line under the long time scale and $P_{grid}(t)$ being the output power of the tie line under the long time scale; the power balance constraint includes:

$$\sum_{i=1}^{NS} P_{stori}(t) + \sum_{j=1}^{NL} \Delta P_{Lj}(t) + \sum_{k=1}^{wind+solar} \hat{P}_k(t) + P_{grid}(t) = \hat{P}_{load}(t) + P_{loss}(t),$$

$P_{grid}(t)$ being the output power of the tie line under the long time scale, $P_{stori}(t)$ being the energy storage output power of long-time-scale optimization scheduling, $\Delta P_{Lj}(t)$ being the flexible load output power of long-time-scale optimization scheduling, $\hat{P}_k(t)$ being the distributed power supply predicted value of the active power distribution network under the long time scale, $\hat{P}_{load}(t)$ being the load predicted value of the active power distribution network under the long time scale and $P_{loss}(t)$ being active power loss of the active power distribution network under the long time scale; the energy storage battery constraint includes: when an energy storage battery is discharged under the long time scale, $P_{storj}(t) > 0$ and a left capacity of a moment t is $$SOC_j(t) = SOC_j(t-1)(1-\sigma) - \frac{P_{storj}(t)}{\eta_D},$$

when the energy storage battery is charged under the long time scale, $P_{storj}(t) < 0$ and the left capacity of the moment t is $SOC_j(t) = SOC_j(t-1)(1-\sigma) - P_{storj}(t)\eta_C$, a charge and discharge power constraint of the energy storage battery under the long time scale is: $P_{storj}^{min} \leq P_{storj}(t) \leq P_{storj}^{max}$, and a capacity constraint of the energy storage battery under the long time scale is: $SOC_j^{min} \leq SOC_j(t) \leq SOC_j^{max}$, where $\sigma$ is a self-discharge rate of the energy storage battery under the long time scale, $\eta_C$ is charge efficiency of the energy storage battery under the long time scale, $\eta_D$ is discharge efficiency of the energy storage battery under the long time scale, $SOC_j(t-1)$ is a left energy storage capacity of a last moment under the long time scale, $SOC_j(t)$ is a left energy storage capacity of the moment t under the long time scale, $SOC_j^{max}$ is an upper limit value of a left capacity of the energy storage battery under the long time scale, $SOC_j^{min}$ is a lower limit value of the left capacity of the energy storage battery under the long time scale, $P_{storj}^{max}$ is an upper limit value of charge power of the energy storage battery under the long time scale, and $P_{storj}^{min}$ is a lower limit value of discharge power of the energy storage battery under the long time scale; the flexible load constraint includes: $\Delta P_{Li\ min} \leq \Delta P_{Li} \leq \Delta P_{Li\ max}$, $\Delta P_{Li\ max}$ being an upper limit value of a flexible load power change under the long time scale, $\Delta P_{Li\ min}$ being a lower limit value of the flexible load power change under the long time scale and $\Delta P_{Lj}(t)$ being the flexible load output power of long-time-scale optimization scheduling; and the network power flow security constraint includes: $V_{min} \leq V_n \leq V_{max}$ and $I_b \leq I_{b.rated}$, $V_n$ being a node voltage amplitude under the long time scale, $V_{max}$ being an upper limit value of the node voltage amplitude under the long time scale, $V_{min}$ being a lower limit value of the node voltage amplitude under the long time scale $I_b$ being a branch current under the long time scale and $I_{b.rated}$ being a branch rated current under the long time scale.

Long-time-scale optimization scheduling of the active power distribution network aims to reduce network loss, improve voltage quality, reduce a load peak and valley difference and increase a utilization rate of clean and renewable energy, a temporary overhauling and power protection requirement of the power distribution network is required to be calculated, and meanwhile, a multi-time-bucket power distribution network operation manner and optimization scheduling solution are made in consideration of a characteristic that errors of power utilization characteristic predicted values of intermittent renewable distributed power supplies and loads are increased along with increase of a prediction time scale.

Figure 4:
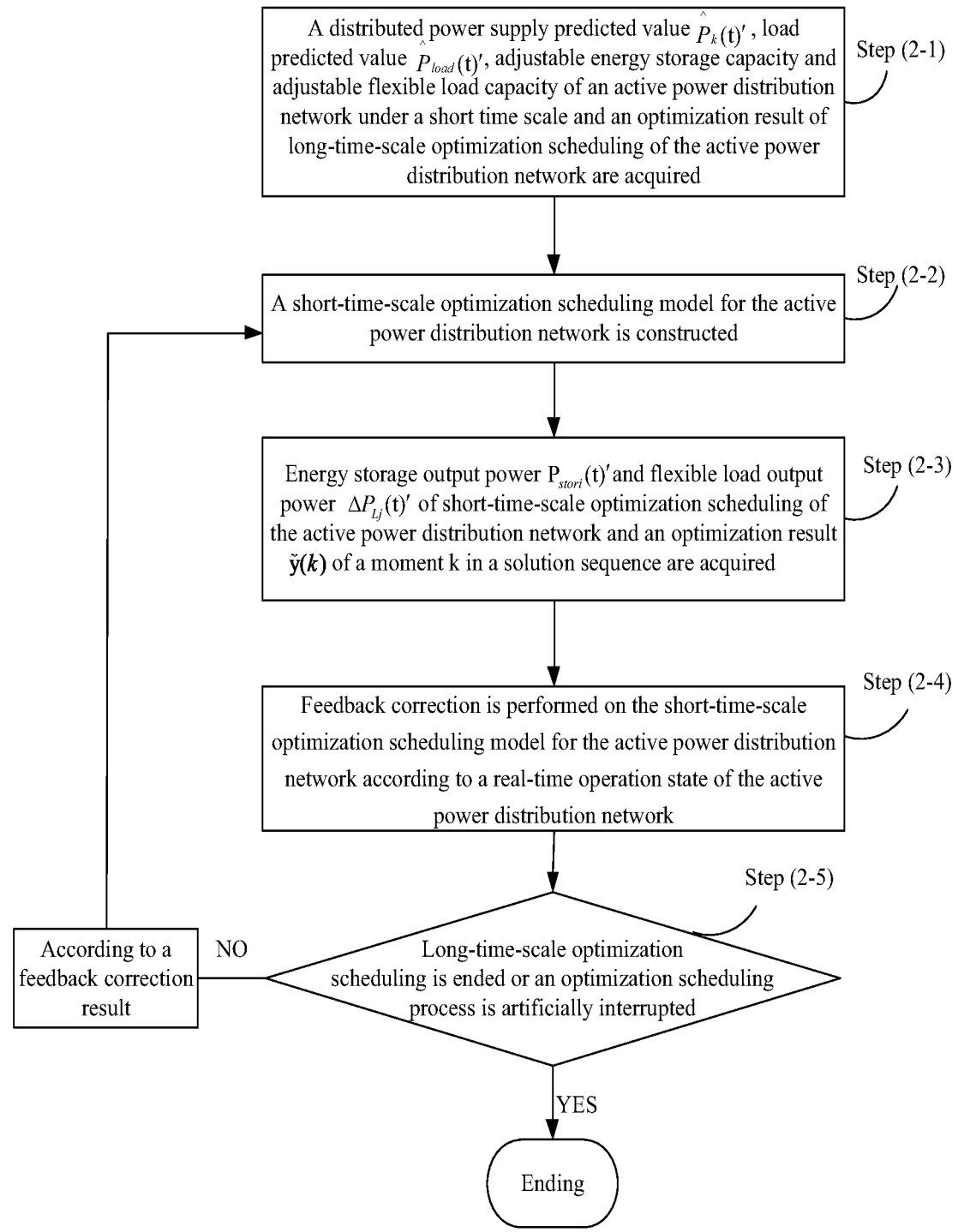
FIG. 4 is a specific flowchart of a method shown in Step (2) in FIG. 1.

Specifically, in combination with FIG. 2 and FIG. 4, Step (2) includes the following steps.

In Step (2-1), a distributed power supply predicted value $\hat{P}_k(t)'$, load predicted value $\hat{P}_{load}(t)'$, adjustable energy storage capacity and adjustable flexible load capacity of the active power distribution network under a short time scale and the optimization result of long-time-scale optimization scheduling of the active power distribution network are acquired, the optimization result of long-time-scale optimization scheduling of the active power distribution network including: the energy storage output power $P_{stori}(t)$ and the flexible load output power $\Delta P_{Lj}(t)$, wherein the distributed power supply predicted value $\hat{P}_k(t)'$ and load predicted value $\hat{P}_{lard}(t)'$ of the active power distribution network under the short time scale are power curves calculated under the short time scale, the adjustable energy storage capacity includes a current left energy storage capacity and an adjustable margin, and the adjustable flexible load capacity is an adjustable flexible load margin calculated according to the importance of the flexible load and the subscribed flexible load adjustment protocol.

In Step (2-2), a short-time-scale optimization scheduling model for the active power distribution network is constructed.

In Step (2-3), energy storage output power $P_{stori}(t)'$ and flexible load output power $\Delta P_{Lj}(t)'$ of short-time-scale optimization scheduling of the active power distribution network and an optimization result $\tilde{y}(k)$ of a moment k in a solution sequence are acquired, $\tilde{y}(k)$ including energy storage output power $P_{stori}(k)'$ of the moment k and flexible load output power $\Delta P_{Lj}(k)'$ of the moment k, wherein the energy storage output power $P_{stori}(t)'$ and flexible load output power $\Delta P_{Lj}(t)'$ of short-time-scale optimization scheduling of the active power distribution network are obtained by solving the short-time-scale optimization scheduling model by the optimization tool.

In Step (2-4), feedback correction is performed on the short-time-scale optimization scheduling model for the active power distribution network according to a real-time operation state of the active power distribution network.

In Step (2-5), if long-time-scale optimization scheduling is ended or an optimization scheduling process is artificially interrupted, short-time-scale optimization scheduling is ended, otherwise rolling optimization is performed on short-time-scale optimization scheduling according to a feedback correction result.

As an implementation mode, the operation that the short-time-scale optimization scheduling model for the active power distribution network is constructed in Step (2-2) includes the following steps.

In Step (2-2-1), an optimization time bucket T of long-time-scale optimization scheduling of the active power distribution network is acquired, and a short-time-scale optimization scheduling period is set.

In Step (2-2-2), a target function for short-time-scale optimization scheduling and a constraint condition are designed.

The short-time-scale optimization scheduling model takes the long-time-scale optimization result as a reference, corrects a reference value by virtue of a short-time-scale prediction model, tracks latest predicted values of the loads and the intermittent new energy on the basis of ensuring optimal economy under the long time scale, and performs optimization scheduling on schedulable resources, and the target function for short-time-scale optimization scheduling is:

$$\min f = \sum_{t=t_0+1}^{t=t_0+T} \left\{ \sum_{i=1}^{NS} \omega_i |P_{stori}(t)' - P_{stori}(t)| + \sum_{j=1}^{NL} \omega_j |\Delta P_{Lj}(t)' - \Delta P_{Lj}(t)| + \omega_g |P_{grid}(t)' - P_{grid}(t)| \right\}, \quad (1\text{-}2)$$

in formula (1-2), T being the optimization time bucket of long-time-scale optimization scheduling of the active power distribution network, $P_{grid}(t)$ being power of the tie line under the long time scale, $P_{stori}(t)$ being the energy storage output power of long-time-scale optimization scheduling, $\Delta P_{Lj}(t)$ being the flexible load output power of long-time-scale optimization scheduling, $P_{grid}(t)'$ being power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\omega_i$ being an energy storage weight coefficient, $\omega_j$ being a flexible load weight coefficient, $\omega_g$ being a tie line weight coefficient, $t_0$ being an initial moment, NL being the number of the flexible loads in the active power distribution network, NS being the number of the energy storage devices and min f being a minimum value of cost in short-time-scale optimization scheduling of the active power distribution network; and the constraint condition includes: the power constraint of the tie line of the active power distribution network and the main network, the power balance constraint, the energy storage battery constraint, the flexible load constraint and the network power flow security constraint.

As an implementation mode, the power constraint of the tie line of the active power distribution network and the main network includes: $-P_L^{max}(t)' \leq P_{grid}(t)' \leq P_L^{max}(t)'$, $P_L^{max}(t)'$ being an upper limit value of active power of the tie line under the short time scale, $P_L^{min}(t)'$ being a lower limit value of the active power of the tie line under the short time scale and $P_{grid}(t)'$ being power of the tie line under the short time scale; the power balance constraint includes:

$$\sum_{i=1}^{NS} P_{stori}(t)' + \sum_{j=1}^{NL} \Delta P_{Lj}(t)' + \sum_{k=1}^{wind+solar} \hat{P}_k(t)' + P_{grid}(t)' = \hat{P}_{load}(t)' + P_{loss}(t)',$$

$P_{grid}(t)'$ being the power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\hat{P}_K(t)'$ being the distributed power supply predicted value of the active power distribution network under the short time scale, $\hat{P}_{load}(t)'$ being the load predicted value of the active power distribution network under the short time scale and $P_{loss}(t)'$ being active power loss of the active power distribution network under the short time scale; the energy storage battery constraint includes: when the energy storage battery is discharged under the short time scale, $P_{storj}(t)'>0$ and the left capacity of the moment t is:

$$SOC_j(t)' = SOC_j(t-1)(1-\sigma)' - \frac{P_{storj}(t)'}{\eta_D'},$$

when the energy storage battery is charged under the short time scale, $P_{storj}(t)'<0$ and the left capacity of the moment t is: $SOC_j(t)' = SOC_j(t-1)(1-\sigma)' - P_{storj}(t)'\eta_C'$, a charge and discharge power constraint of the energy storage battery under the short time scale is: $P_{storj}^{min'} \leq P_{storj}(t)' \leq P_{storj}^{max'}$, and a capacity constraint of the energy storage battery under the short time scale is: $SOC_j^{min'} \leq SOC_j(t)' \leq SOC_j^{max'}$, where σ' is a self-discharge rate of the energy storage battery under the short time scale, $\eta_C'$ is charge efficiency of the energy storage battery under the short time scale, $\eta_D'$ is discharge efficiency of the energy storage battery under the short time scale, $SOC_j(t-1)'$ is a left energy storage capacity of the last moment under the short time scale, $SOC_j(t)'$ is a left energy storage capacity of the moment t under the short time scale, $SOC_j^{max'}$ is an upper limit value of a left capacity of the energy storage battery under the short time scale, $SOC_j^{min'}$ is a lower limit value of the left capacity of the energy storage battery under the short time scale, $P_{storj}^{max'}$ is an upper limit value of charge power of the energy storage battery under the short time scale, and $P_{storj}^{min'}$ is a tower limit value of the discharge power of the energy storage battery under the short time scale; the flexible load constraint includes: $\Delta P_{Li\,min}' \leq \Delta P_{Li}' \leq \Delta P_{Li\,max}'$, $\Delta P_{Li\,max}'$ being an upper limit value of a flexible load power change under the short time scale, $\Delta P_{Li\,min}'$ being a lower limit value of the flexible load power change under the short time scale and $\Delta P_{Lj}(t)'$ being flexible load output power of short-time-scale optimization scheduling; and the network power flow security constraint includes: $V_{min}' \leq V_n' \leq V_{max}'$ and $I_b' \leq I_{b.rated}'$, $V_n'$ being a node voltage amplitude under the short time scale, $V_{max}'$ being an upper limit value of the node voltage amplitude under the short time scale, $V_{min}'$ being a lower limit value of the node voltage amplitude under the short time scale, $I_b'$ being a branch current under the short time scale and $I_{b.rated}'$ being a branch rated current under the short time scale.

As an implementation mode, the operation that feedback correction is performed on the short-time-scale optimization scheduling model for the active power distribution network according to the real-time operation state of the active power distribution network in Step (2-4) includes the following steps.

In Step (2-4-1), the optimization time bucket T of long-time-scale optimization scheduling of the active power distribution network is acquired, a prediction period m of short-time-scale optimization scheduling of the active power distribution network is set, and an optimization time bucket p of short-time-scale optimization scheduling of the active power distribution network is calculated.

In Step (2-4-2), an error e(k) between a practical output result y(k) of the active power distribution network at the moment k and the optimization result ỹ(k) of the moment k in short-time-scale optimization scheduling of the active power distribution network is calculated:

$$e(k)=y(k)-\tilde{y}(k) \quad (1\text{-}3).$$

In Step (2-4-3), optimization results from moments k+1 to k+p in short-time-scale optimization scheduling of the active power distribution network are corrected according to the error e(k):

$$\begin{bmatrix} \tilde{y}_1(k+1) \\ \tilde{y}_1(k+2) \\ \vdots \\ \tilde{y}_1(k+p) \end{bmatrix} = \begin{bmatrix} \tilde{y}(k+1) \\ \tilde{y}(k+1) \\ \vdots \\ \tilde{y}(k+p) \end{bmatrix} + \begin{bmatrix} h_{k+1} \\ h_{k+2} \\ \vdots \\ h_{k+p} \end{bmatrix} e(k), \quad (1\text{-}4)$$

in formula (1-4), $\tilde{y}_1(k+p)$ being a correction result of the optimization result $\tilde{y}(k+p)$ of the moment k+p, and $h_{k+p}$ being model information of the moment k+p, being obtained by offline identification and being a constant matrix.

Short-time-scale optimization scheduling aims to ensure power supply reliability of important loads, smoothen the power curves and improve the voltage quality, and the long-time-scale optimization scheduling solution is required to be corrected in consideration of emergent factors such as failures and temporary power outage for errors obtained by comparing the intermittent distributed energy and load predicted values with long-time-scale predicted values to smoothen fluctuation of output of the distributed power supplies and implement power smoothening and energy balancing.

Those skilled in the art may know that: all or part of the steps implementing the method embodiment may be implemented by instructing related hardware through a program, the program may be stored in a computer-readable storage medium, and the program is executed to execute the steps of the method embodiment; and the storage medium includes: various media capable of storing program codes such as mobile storage equipment, a Read-Only Memory (ROM), a magnetic disk or an optical disk.

Or, when being implemented in form of software function module and sold or used as an independent product, the integrated module of the embodiment of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The storage medium includes: various media capable of storing program codes such as mobile storage equipment, a ROM, a magnetic disk or an optical disk.

The abovementioned embodiments are only examples and not intended to limit information transmission method and device recorded in the embodiments of the disclosure. Those skilled in the art should know that: the technical solutions recorded in each embodiment may still be modified, or part or all technical characteristics therein may be equivalently replaced, and these modifications or replacements are not intended to make the essence of the corresponding technical solutions depart from the scope of the technical solution of each embodiment of the disclosure.

The above is only the preferred embodiment of the disclosure and not intended to limit the scope of protection of the disclosure.

INDUSTRIAL APPLICABILITY

According to the technical solutions of the embodiments of the disclosure, an MPC method is adopted, and rolling correction is performed under the short time scale by taking the long-time-scale optimization scheduling result as a reference to implement optimization scheduling of the active power distribution network, thereby reducing negative influence of prediction accuracy of the distributed power supplies and the low-voltage loads on optimization scheduling.

The invention claimed is:

1. A multi-time-scale coordinated optimization scheduling method for an active power distribution network, comprising the following steps:
   (1) performing long-time-scale optimization scheduling on the active power distribution network (1); and
   (2) performing Model Predictive Control (MPC)-based short-time-scale rolling optimization scheduling on the active power distribution network according to an optimization result of long-time-scale optimization scheduling of the active power distribution network,
   wherein Step (1) comprises:
   (1-1) acquiring a distributed power supply predicted value $\hat{P}_k(t)$, load predicted value $\hat{P}_{load}(t)$, adjustable energy storage capacity and adjustable flexible load capacity of the active power distribution network under a long time scale;
   (1-2) constructing a long-time-scale optimization scheduling model for the active power distribution network; and
   (1-3) acquiring the optimization result of long-time-scale optimization scheduling of the active power distribution network, the optimization result comprising: energy storage output power $P_{stori}(t)$ and flexible load output power $\Delta P_{Lj}(t)$,
   wherein the long-time-scale optimization scheduling model for the active power distribution network in Step (1-2) comprises: a target function for long-time-scale optimization scheduling and a constraint condition;
   the target function for long-time-scale optimization scheduling is:

$$\min F = \min \sum_{t=1}^{T1} \left\{ c_{grid}(t) P_{grid}(t) + \sum_{i=1}^{NL} C_{loadi}(t) + \sum_{j=1}^{NS} C_{storj}(t) \right\}, \quad (1)$$

in formula (1), min F being a minimum value of cost in long-time-scale optimization scheduling of the active power distribution network, $c_{grid}(t)$ representing a time-of-use electricity price of a power grid, $P_{grid}(t)$ being output power of a tie line under the long time scale, $C_{loadi}(t)$ being flexible load scheduling cost, $C_{storj}(t)$ being energy storage equipment scheduling cost, T1 representing a long-time-scale optimization scheduling period, NL being a number of flexible loads in the active power distribution network and NS being a number of energy storage devices; and the constraint condition comprises: a power constraint of the tie line of the active power distribution network and a main network, a power balance constraint, an energy storage battery constraint, a flexible load constraint and a network power flow security constraint.

2. The method according to claim 1, wherein the power constraint of the tie line of the active power distribution network and the main network comprises: $-P_L^{max}(t) \leq P_{grid}(t) \leq P_L^{max}(t)$, $P_L^{max}(t)$ being an upper limit value of active power of the tie lie under the long time scale, $P_L^{min}(t)$ being a lower limit value of the active power of the tie line under the long time scale and $P_{grid}(t)$ being the output power of the tie line under the long time scale; the power balance constraint comprises:

$$\sum_{i=1}^{NS} P_{stori}(t) + \sum_{j=1}^{NL} \Delta P_{Lj}(t) + \sum_{k=1}^{wind+solar} \hat{P}_k(t) + P_{grid}(t) = \hat{P}_{load}(t) + P_{loss}(t),$$

$P_{grid}(t)$ being the output power of the tie line under the long time scale, $P_{stori}(t)$ being the energy storage output power of long-time-scale optimization scheduling, $\Delta P_{Lj}(t)$ being the flexible load output power of long-time-scale optimization scheduling, $\hat{P}_k(t)$ being the distributed power supply predicted value of the active power distribution network under the long time scale, $\hat{P}_{load}(t)$ being the load predicted value of the active power distribution network under the long time scale and $P_{loss}(t)$ being active power loss of the active power distribution network under the long time scale; the energy storage battery constraint comprises: when an energy storage battery is discharged under the long time scale, $P_{storj}(t) > 0$ and a left capacity of a moment t is $$SOC_j(t) = SOC_j(t-1)(1-\sigma) - \frac{P_{storj}(t)}{\eta_D},$$

when the energy storage battery is charged under the long time scale, $P_{storj}(t) < 0$ and the left capacity of the moment t is $SOC_j = SOC_j(t-1)(1-\sigma) - P_{storj}(t)\eta_C$, a charge and discharge power constraint of the energy storage battery under the long time scale is: $P_{storj}^{min} \leq P_{storj}(t) \leq P_{storj}^{max}$, and a capacity constraint of the energy storage battery under the long time scale is: $SOC_j^{min} \leq SOC_j(t) \leq SOC_j^{max}$, where σ is a self-discharge rate of the energy storage battery under the long time scale, $\eta_C$ is charge efficiency of the energy storage battery under the long time scale, $\eta_D$ is discharge efficiency of the energy storage battery under the long time scale, $SOC_j(t-1)$ is a left energy storage capacity of a last moment under the long time scale, $SOC_j(t)$ is a left energy storage capacity of the moment t under the long time scale, $SOC_j^{max}$ is an upper limit value of a left capacity of the energy storage battery under the long time scale, $SOC_j^{min}$ is a lower limit value of the left capacity of the energy storage battery under the long time scale, $P_{storj}^{max}$ is an upper limit value of charge power of the energy storage battery under the long time scale, and $P_{storj}^{min}$ is a lower limit value of discharge power of the energy storage battery under the long time scale; the flexible load constraint comprises: $\Delta P_{Li\ min} \leq \Delta P_{Li} \leq \Delta P_{Li\ max}$, $\Delta P_{Li\ max}$ being an upper limit value of a flexible load power change under the long time scale, $\Delta P_{Li\ min}$ being a lower limit value of the flexible load power change under the long time scale and $\Delta P_{Lj}(t)$ being the flexible load output power of long-time-scale optimization scheduling; and the network power flow security constraint comprises: $V_{min} \leq V_n \leq V_{max}$ and $I_b \leq I_{b.rated}$, $V_n$ being a node voltage amplitude under the long time scale, $V_{max}$ being an upper limit value of the node voltage amplitude under the long time scale, $V_{min}$ being a lower limit value of the node voltage amplitude under the long time scale, $I_b$ being a branch current under the long time scale and $I_{b.rated}$ being a branch rated current under the long time scale.

3. The method according to claim 1, wherein Step (2) comprises:

(2-1) acquiring a distributed power supply predicted value $\hat{P}_k(t)'$, load predicted value $\hat{P}_{load}(t)'$ adjustable energy storage capacity and adjustable flexible load capacity of the active power distribution network under a short time scale and the optimization result of long-time-scale optimization scheduling of the active power distribution network, the optimization result of long-time-scale optimization scheduling of the active power distribution network comprising: the energy storage output power $P_{stori}(t)$ and the flexible load output power $\Delta P_{Lj}(t)$;

(2-2) constructing a short-time-scale optimization scheduling model for the active power distribution network;

(2-3) acquiring energy storage output power $P_{stori}(t)'$ and flexible load output power $\Delta P_{Lj}(t)'$ of short-time-scale optimization scheduling of the active power distribution network and an optimization result $\tilde{y}(k)$ of a moment k in a solution sequence, $\tilde{y}(k)$ comprising energy storage output power $P_{stori}(k)'$ of the moment k and flexible load output power $\Delta P_{Lj}(k)'$ of the moment k;

(2-4) performing feedback correction on the short-time-scale optimization scheduling model for the active power distribution network according to a real-time operation state of the active power distribution network; and (2-5) if long-time-scale optimization scheduling is ended or an optimization scheduling process is artificially interrupted, ending short-time-scale optimization scheduling, otherwise performing rolling optimization on short-time-scale optimization scheduling according to a feedback correction result.

4. The method according to claim 3, wherein constructing the short-time-scale optimization scheduling model for the active power distribution network in Step (2-2) comprises:

(2-2-1) acquiring an optimization time bucket T of long-time-scale optimization scheduling of the active power distribution network, and setting a short-time-scale optimization scheduling period; and (2-2-2) designing a target function for short-time-scale optimization scheduling and a constraint condition, wherein the target function for short-time-scale optimization scheduling is:

$$\min f = \sum_{t=t_0+1}^{t_0+T} \left\{ \sum_{i=1}^{NS} \omega_i |P_{stori}(t)' - P_{stori}(t)| + \right. \tag{2}$$

-continued $$\sum_{j=1}^{NL} \omega_j |\Delta P_{Lj}(t)' - \Delta P_{Lj}(t)| + \omega_g |P_{grid}(t)' - P_{grid}(t)| \Bigg\},$$

in formula (2), T being the optimization time bucket of long-time-scale optimization scheduling of the active power distribution network, $P_{grid}(t)$ being power of the tie line under the long time scale, $P_{stori}(t)$ being the energy storage output power of long-time-scale optimization scheduling, $\Delta P_{Lj}(t)$ being the flexible load output power of long-time-scale optimization scheduling, $P_{grid}(t)'$ being power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\omega_i$ being an energy storage weight coefficient, $\omega_j$ being a flexible load weight coefficient, $\omega_g$ being a tie line weight coefficient, $t_0$ being an initial moment, NL being the number of the flexible loads in the active power distribution network, NS being the number of the energy storage devices and min f being a minimum value of cost in short-time-scale optimization scheduling of the active power distribution network; and the constraint condition comprises: the power constraint of the tie line of the active power distribution network and the main network, the power balance constraint, the energy storage battery constraint, the flexible load constraint and the network power flow security constraint.

5. The method according to claim 4, wherein the power constraint of the tie line of the active power distribution network and the main network comprises: $-P_L^{max}(t)' \leq P_{grid}(t)' \leq P_L^{max}(t)'$, $P_L^{max}(t)'$ being an upper limit value of active power of the tie lie under the short time scale, $P_L^{min}(t)'$ being a lower limit value of the active power of the tie line under the short time scale and $P_{grid}(t)'$ being power of the tie line under the short time scale; the power balance constraint comprises:

$$\sum_{i=1}^{NS} P_{stori}(t)' + \sum_{j=1}^{NL} \Delta P_{Lj}(t') + \sum_{k=1}^{wind+solar} \hat{P}_k(t)' + P_{grid}(t)' =$$

$$\hat{P}_{load}(t)' + P_{loss}(t)',$$

$P_{grid}(t)'$ being the power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\hat{P}_k(t)'$ being the distributed power supply predicted value of the active power distribution network under the short time scale, $\hat{P}_{load}(t)'$ being the load predicted value of the active power distribution network under the short time scale and $P_{loss}(t)'$ being active power loss of the active power distribution network under the short time scale; the energy storage battery constraint comprises: when the energy storage battery is discharged under the short time scale, $P_{storj}(t)'>0$ and the left capacity of the moment t is:

$$SOC_j(t)' = SOC_j(t-1)(1-\sigma)' - \frac{P_{storj}(t)'}{\eta_D'},$$

when the energy storage battery is charged under the short time scale, $P_{storj}(t)'<0$ and the left capacity of the moment t is: $SOC_j(t)'=SOC_j(t-1)(1-\sigma)'-P_{storj}(t)'\eta_C'$, a charge and discharge power constraint of the energy storage battery under the short time scale is: $P_{storj}^{min'} \leq P_{storj}(t)' \leq P_{storj}^{maxi}$, and a capacity constraint of the energy storage battery under the short time scale is: $SOC_j^{min'} \leq SOC_j(t)' \leq SOC_j^{maxi}$, where $\sigma'$ is a self-discharge rate of the energy storage battery under the short time scale, $\eta_C'$ is charge efficiency of the energy storage battery under the short time scale, $\eta_D'$ is discharge efficiency of the energy storage battery under the short time scale, $SOC_j(t-1)'$ is a left energy storage capacity of the last moment under the short time scale, $SOC_j(t)'$ is a left energy storage capacity of the moment t under the short time scale, $SOC_j^{maxi}$ is an upper limit value of a left capacity of the energy storage battery under the short time scale, $SOC_j^{min'}$ is a lower limit value of the left capacity of the energy storage battery under the short time scale, $P_{storj}^{maxi}$ is an upper limit value of charge power of the energy storage battery under the short time scale, and $P_{storj}^{min'}$ is a lower limit value of the discharge power of the energy storage battery under the short time scale; the flexible load constraint comprises: $\Delta P_{Li\ min}' \leq \Delta P_{Li}' \leq \Delta P_{Li\ max}'$, $\Delta P_{Li\ max}'$ being an upper limit value of a flexible load power change under the short time scale, $\Delta P_{Li\ min}'$ being a lower limit value of the flexible load power change under the short time scale and $\Delta P_{Lj}(t)'$ being flexible load output power of short-time-scale optimization scheduling; and the network power flow security constraint comprises: $V_{min}' \leq V_n' \leq V_{max}'$ and $I_b' \leq I_{b.rated}'$, $V_n'$ being a node voltage amplitude under the short time scale, $V_{max}'$ being an upper limit value of the node voltage amplitude under the short time scale, $V_{min}'$ being a lower limit value of the node voltage amplitude under the short time scale, $I_b'$ being a branch current under the short time scale and $I_{b.rated}'$ being a branch rated current under the short time scale.

6. The method according to claim 3, wherein performing feedback correction on the short-time-scale optimization scheduling model for the active power distribution network according to the real-time operation state of the active power distribution network in Step (2-4) comprises:

(2-4-1) acquiring the optimization time bucket T of long-time-scale optimization scheduling of the active power distribution network, setting a prediction period m of short-time-scale optimization scheduling of the active power distribution network, and calculating an optimization time bucket p of short-time-scale optimization scheduling of the active power distribution network;

(2-4-2) calculating an error e(k) between a practical output result y(k) of the active power distribution network at the moment k and the optimization result ŷ(k) of the moment k in short-time-scale optimization scheduling of the active power distribution network:

$$e(k)=y(k)-\tilde{y}(k) \qquad (3); \text{ and}$$

(2-4-3) correcting optimization results from moments k+1 to k+p in short-time-scale optimization scheduling of the active power distribution network according to the error e(k):

$$\begin{bmatrix} \tilde{y}_1(k+1) \\ \tilde{y}_1(k+2) \\ \vdots \\ \tilde{y}_1(k+p) \end{bmatrix} = \begin{bmatrix} \tilde{y}(k+1) \\ \tilde{y}(k+1) \\ \vdots \\ \tilde{y}(k+p) \end{bmatrix} + \begin{bmatrix} h_{k+1} \\ h_{k+2} \\ \vdots \\ h_{k+p} \end{bmatrix} e(k), \qquad (4)$$

in formula (4), $\tilde{y}_1(k+p)$ being a correction result of the optimization result $\tilde{y}(k+p)$ of the moment k+p, and $h_{k+p}$ being model information of the moment k+p, being obtained by offline identification and being a constant matrix.

7. A non-transitory storage medium having stored therein a computer-executable instruction configured to execute a multi-time-scale coordinated optimization scheduling method for an active power distribution network, the method comprising steps:
(1) performing long-time-scale optimization scheduling on the active power distribution network (1); and
(2) performing Model Predictive Control (MPC)-based short-time-scale rolling optimization scheduling on the active power distribution network according to an optimization result of long-time-scale optimization scheduling of the active power distribution network,
wherein Step (1) comprises:
(1-1) acquiring a distributed power supply predicted value $\hat{P}_k(t)$, load predicted value $\hat{P}_{load}(t)$, adjustable energy storage capacity and adjustable flexible load capacity of the active power distribution network under a long time scale;
(1-2) constructing a long-time-scale optimization scheduling model for the active power distribution network; and
(1-3) acquiring the optimization result of long-time-scale optimization scheduling of the active power distribution network, the optimization result comprising: energy storage output power $P_{stori}(t)$ and flexible load output power $\Delta P_{Lj}(t)$,
wherein the long-time-scale optimization scheduling model for the active power distribution network in Step (1-2) comprises: a target function for long-time-scale optimization scheduling and a constraint condition;
the target function for long-time-scale optimization scheduling is:

$$\min F = \min \sum_{t=1}^{T1} \left\{ c_{grid}(t)P_{grid}(t) + \sum_{i=1}^{NL} C_{loadi}(t) + \sum_{j=1}^{NS} C_{storj}(t) \right\}, \quad (1)$$

in formula (1), min F being a minimum value of cost in long-time-scale optimization scheduling of the active power distribution network, $c_{grid}(t)$ representing a time-of-use electricity price of a power grid, $P_{grid}(t)$ being output power of a tie line under the long time scale, $C_{loadi}(t)$ being flexible load scheduling cost, $C_{storj}(t)$ being energy storage equipment scheduling cost, T1 representing a long-time-scale optimization scheduling period, NL being a number of flexible loads in the active power distribution network and NS being a number of energy storage devices; and
the constraint condition comprises: a power constraint of the tie line of the active power distribution network and a main network, a power balance constraint, an energy storage battery constraint, a flexible load constraint and a network power flow security constraint.

8. The non-transitory storage medium according to claim 7, wherein
the power constraint of the tie line of the active power distribution network and the main network comprises: $-P_L^{max}(t) \leq P_{grid}(t) \leq P_L^{max}(t)$, $P_L^{max}(t)$ being an upper limit value of active power of the tie lie under the long time scale, $P_L^{min}(t)$ being a lower limit value of the active power of the tie line under the long time scale and $P_{grid}(t)$ being the output power of the tie line under the long time scale; the power balance constraint comprises:

$$\sum_{i=1}^{NS} P_{stori}(t) + \sum_{j=1}^{NL} \Delta P_{Lj}(t) + \sum_{k=1}^{wind+solar} \hat{P}_k(t) + P_{grid}(t) = \hat{P}_{load}(t) + P_{loss}(t),$$

$P_{grid}(t)$ being the output power of the tie line under the long time scale, $P_{stori}(t)$ being the energy storage output power of long-time-scale optimization scheduling, $\Delta P_{Lj}(t)$ being the flexible load output power of long-time-scale optimization scheduling, $\hat{P}_k(t)$ being the distributed power supply predicted value of the active power distribution network under the long time scale, $\hat{P}_{load}(t)$ being the load predicted value of the active power distribution network under the long time scale and $P_{loss}(t)$ being active power loss of the active power distribution network under the long time scale; the energy storage battery constraint comprises: when an energy storage battery is discharged under the long time scale, $P_{storj}(t) > 0$ and a left capacity of a moment t is $$SOC_j(t) = SOC_j(t-1)(1-\sigma) - \frac{P_{storj}(t)}{\eta_D},$$

when the energy storage battery is charged under the long time scale, $P_{storj}(t) < 0$ and the left capacity of the moment t is $SOC_j(t) = SOC_j(t-1)(1-\sigma) - P_{storj}(t)\eta_C$, a charge and discharge power constraint of the energy storage battery under the long time scale is: $P_{storj}^{min} \leq P_{storj}(t) \leq P_{storj}^{max}$, and a capacity constraint of the energy storage battery under the long time scale is: $SOC_j^{min} \leq SOC_j(t) \leq SOC_j^{max}$, where σ is a self-discharge rate of the energy storage battery under the long time scale, $\eta_C$ is charge efficiency of the energy storage battery under the long time scale, $\eta_D$ is discharge efficiency of the energy storage battery under the long time scale, $SOC_j(t-1)$ is a left energy storage capacity of a last moment under the long time scale, $SOC_j(t)$ is a left energy storage capacity of the moment t under the long time scale, $SOC_j^{max}$ is an upper limit value of a left capacity of the energy storage battery under the long time scale, $SOC_j^{min}$ is a lower limit value of the left capacity of the energy storage battery under the long time scale, $P_{storj}^{max}$ is an upper limit value of charge power of the energy storage battery under the long time scale, and $P_{storj}^{min}$ is a lower limit value of discharge power of the energy storage battery under the long time scale; the flexible load constraint comprises: $\Delta P_{Li\ min} \leq \Delta P_{Li} \leq \Delta P_{Li\ max}$, $\Delta P_{Li\ max}$ being an upper limit value of a flexible load power change under the long time scale, $\Delta P_{Li\ min}$ being a lower limit value of the flexible load power change under the long time scale and $\Delta P_{Lj}(t)$ being the flexible load output power of long-time-scale optimization scheduling; and the network power flow security constraint comprises: $V_{min} \leq V_n \leq V_{max}$ and $I_b \leq I_{b.rated}$, $V_n$ being a node voltage amplitude under the long time scale, $V_{max}$ being an upper limit value of the node voltage amplitude under the long time scale, $V_{min}$ being a lower limit value of the node voltage amplitude under the long time scale, $I_b$ being a branch current under the long time scale and $I_{b.rated}$ being a branch rated current under the long time scale.

9. The non-transitory storage medium according to claim 7, wherein Step (2) comprises:
- (2-1) acquiring a distributed power supply predicted value $\hat{P}_k(t)'$ load predicted value $\hat{P}_{load}(t)'$, adjustable energy storage capacity and adjustable flexible load capacity of the active power distribution network under a short time scale and the optimization result of long-time-scale optimization scheduling of the active power distribution network, the optimization result of long-time-scale optimization scheduling of the active power distribution network comprising: the energy storage output power $P_{stori}(t)$ and the flexible load output power $\Delta P_{Lj}(t)$;
- (2-2) constructing a short-time-scale optimization scheduling model for the active power distribution network;
- (2-3) acquiring energy storage output power $P_{stori}(t)'$ and flexible load output power $\Delta P_{Lj}(t)'$ of short-time-scale optimization scheduling of the active power distribution network and an optimization result $\tilde{y}(k)$ of a moment k in a solution sequence, $\tilde{y}(k)$ comprising energy storage output power $P_{stori}(k)'$ of the moment k and flexible load output power $\Delta P_{Lj}(k)'$ of the moment k;
- (2-4) performing feedback correction on the short-time-scale optimization scheduling model for the active power distribution network according to a real-time operation state of the active power distribution network; and
- (2-5) if long-time-scale optimization scheduling is ended or an optimization scheduling process is artificially interrupted, ending short-time-scale optimization scheduling, otherwise performing rolling optimization on short-time-scale optimization scheduling according to a feedback correction result.

10. The non-transitory storage medium according to claim 9, wherein constructing the short-time-scale optimization scheduling model for the active power distribution network in Step (2-2) comprises:
- (2-2-1) acquiring an optimization time bucket T of long-time-scale optimization scheduling of the active power distribution network, and setting a short-time-scale optimization scheduling period; and
- (2-2-2) designing a target function for short-time-scale optimization scheduling and a constraint condition, wherein the target function for short-time-scale optimization scheduling is:

$$\min f = \sum_{t=t_0+1}^{t=t_0+T} \left\{ \sum_{i=1}^{NS} \omega_i |P_{stori}(t)' - P_{stori}(t)| + \sum_{j=1}^{NL} \omega_j |\Delta P_{Lj}(t)' - \Delta P_{Lj}(t)| + \omega_g |P_{grid}(t)' - P_{grid}(t)| \right\}, \quad (2)$$

in formula (2), T being the optimization time bucket of long-time-scale optimization scheduling of the active power distribution network, $P_{grid}(t)$ being power of the tie line under the long time scale, $P_{stori}(t)$ being the energy storage output power of long-time-scale optimization scheduling, $\Delta P_{Lj}(t)$ being the flexible load output power of long-time-scale optimization scheduling, $P_{grid}(t)'$ being power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\omega_1$ being an energy storage weight coefficient, $\omega_1$ being a flexible load weight coefficient, $\omega_g$ being a tie line weight coefficient, to being an initial moment, NL being the number of the flexible loads in the active power distribution network, NS being the number of the energy storage devices and min f being a minimum value of cost in short-time-scale optimization scheduling of the active power distribution network; and the constraint condition comprises: the power constraint of the tie line of the active power distribution network and the main network, the power balance constraint, the energy storage battery constraint, the flexible load constraint and the network power flow security constraint.

11. The non-transitory storage medium according to claim 10, wherein the power constraint of the tie line of the active power distribution network and the main network comprises: $-P_L^{max}(t)' \leq P_{grid}(t)' \leq P_L^{max}(t)'$, $P_L^{max}(t)'$ being an upper limit value of active power of the tie lie under the short time scale, $P_L^{min}(t)'$ being a lower limit value of the active power of the tie line under the short time scale and $P_{grid}(t)'$ being power of the tie line under the short time scale; the power balance constraint comprises:

$$\sum_{i=1}^{NS} P_{stori}(t)' + \sum_{j=1}^{NL} \Delta P_{Lj}(t') + \sum_{k=1}^{wind+solar} \hat{P}_k(t)' + P_{grid}(t)' = \hat{P}_{load}(t)' + P_{loss}(t)',$$

$P_{grid}(t)'$ being the power of the tie line under the short time scale, $P_{stori}(t)'$ being the energy storage output power of short-time-scale optimization scheduling, $\Delta P_{Lj}(t)'$ being the flexible load output power of short-time-scale optimization scheduling, $\hat{P}_k(t)'$ being the distributed power supply predicted value of the active power distribution network under the short time scale, $\hat{P}_{load}(t)'$ being the load predicted value of the active power distribution network under the short time scale and $P_{loss}(t)'$ being active power loss of the active power distribution network under the short time scale; the energy storage battery constraint comprises: when the energy storage battery is discharged under the short time scale, $P_{storj}(t)'>0$ and the left capacity of the moment t is:

$$SOC_j(t)' = SOC_j(t-1)(1-\sigma)' - \frac{P_{storj}(t)'}{\eta_D'},$$

when the energy storage battery is charged under the short time scale, $P_{storj}(t)'<0$ and the left capacity of the moment t is: $SOC_j(t)'=SOC_j(t-1)(1-\sigma)'-P_{storj}(t)'\eta_C'$, a charge and discharge power constraint of the energy storage battery under the short time scale is: $P_{storj}^{min} \leq P_{storj}(t)' \leq P_{storj}^{max}$, and a capacity constraint of the energy storage battery under the short time scale is: $SOC_j^{min} \leq SOC_j(t)' \leq SOC_j^{max}$, where $\sigma'$ is a self-discharge rate of the energy storage battery under the short time scale, $\eta_C'$ is charge efficiency of the energy storage battery under the short time scale, $\eta_D'$ is discharge efficiency of the energy storage battery under the short time scale, $SOC_j(t-1)'$ is a left energy storage capacity of the last moment under the short time scale, $SOC_j(t)'$ is a left energy storage capacity of the moment t under the short time scale, $SOC_j^{max}$ is an upper limit value of a left capacity of the energy storage battery under the short time scale, $SOC_j^{min}$ is a lower limit value of the left capacity of the energy storage battery under the short time scale, $P_{storj}^{max}{}'$ is an upper limit value of charge power of the energy storage battery under the short time scale, and $P_{storj}^{min}{}'$ is a lower limit value of the discharge power of the energy storage battery under the short time scale; the flexible load constraint comprises: $\Delta P_{Li\,min}{}' \leq \Delta P_{Li}{}' \leq \Delta P_{Li\,max}{}'$, $\Delta P_{Li\,max}{}'$ being an upper limit value of a flexible load power change under the short time scale, $\Delta P_{Li\,min}{}'$ being a lower limit value of the flexible load power change under the short time scale and $\Delta P_{Lj}(t)'$ being flexible load output power of short-time-scale optimization scheduling; and the network power flow security constraint comprises: $V_{min}{}' \leq V_n{}' \leq V_{max}{}'$ and $I_b{}' \leq I_{b.rated}{}'$, $V_n{}'$ being a node voltage amplitude under the short time scale, $V_{max}{}'$ being an upper limit value of the node voltage amplitude under the short time scale, $V_{min}{}'$ being a lower limit value of the node voltage amplitude under the short time scale, $I_b{}'$ being a branch current under the short time scale and $I_{b.rated}{}'$ being a branch rated current under the short time scale.

12. The non-transitory storage medium according to claim 9, wherein performing feedback correction on the short-time-scale optimization scheduling model for the active power distribution network according to the real-time operation state of the active power distribution network in Step (2-4) comprises:

(2-4-1) acquiring the optimization time bucket T of long-time-scale optimization scheduling of the active power distribution network, setting a prediction period m of short-time-scale optimization scheduling of the active power distribution network, and calculating an optimization time bucket p of short-time-scale optimization scheduling of the active power distribution network;

(2-4-2) calculating an error e(k) between a practical output result y(k) of the active power distribution network at the moment k and the optimization result ỹ(k) of the moment k in short-time-scale optimization scheduling of the active power distribution network:

$$e(k) = y(k) - \tilde{y}(k) \quad (3); \text{ and}$$

(2-4-3) correcting optimization results from moments k+1 to k+p in short-time-scale optimization scheduling of the active power distribution network according to the error e(k):

$$\begin{bmatrix} \tilde{y}_1(k+1) \\ \tilde{y}_1(k+2) \\ \vdots \\ \tilde{y}_1(k+p) \end{bmatrix} = \begin{bmatrix} \tilde{y}(k+1) \\ \tilde{y}(k+1) \\ \vdots \\ \tilde{y}(k+p) \end{bmatrix} + \begin{bmatrix} h_{k+1} \\ h_{k+2} \\ \vdots \\ h_{k+p} \end{bmatrix} e(k), \quad (4)$$

in formula (4), $\tilde{y}_1(k+p)$ being a correction result of the optimization result $\tilde{y}(k+p)$ of the moment k+p, and $h_{k+p}$ being model information of the moment k+p, being obtained by offline identification and being a constant matrix.

* * * * *